(12) United States Patent
Ueno et al.

(10) Patent No.: US 9,542,000 B2
(45) Date of Patent: Jan. 10, 2017

(54) ELECTRONIC DEVICE AND CONTROL METHOD FOR ELECTRONIC DEVICE

(75) Inventors: Yasuhiro Ueno, Kanagawa (JP); Masatsugu Nakamura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 302 days.

(21) Appl. No.: 13/371,132

(22) Filed: Feb. 10, 2012

(65) Prior Publication Data

US 2012/0206390 A1    Aug. 16, 2012

(30) Foreign Application Priority Data

Feb. 10, 2011 (JP) ................................. 2011-026765

(51) Int. Cl.
*G06F 3/01* (2006.01)
*G06F 3/0488* (2013.01)

(52) U.S. Cl.
CPC ........... *G06F 3/016* (2013.01); *G06F 3/04886* (2013.01)

(58) Field of Classification Search
CPC ..... G06F 3/016; G06F 3/0414; G06F 3/04886
USPC ..................... 345/156–184; 178/18.03–18.06
See application file for complete search history.

(56) References Cited

U.S. PATENT DOCUMENTS

| 7,248,301 | B2 * | 7/2007 | Voss ................... H04N 5/23293 |
| | | | 348/333.04 |
| 2003/0095709 | A1 | 5/2003 | Zhou |
| 2003/0122779 | A1 * | 7/2003 | Martin .................. G06F 1/1662 |
| | | | 345/156 |
| 2008/0298702 | A1 * | 12/2008 | Gunupudi ............ H04N 19/149 |
| | | | 382/251 |
| 2009/0148041 | A1 | 6/2009 | Piramuthu |
| 2009/0167508 | A1 | 7/2009 | Fadell et al. |
| 2009/0250267 | A1 * | 10/2009 | Heubel ................... G06F 3/041 |
| | | | 178/18.03 |

(Continued)

FOREIGN PATENT DOCUMENTS

| JP | H10-293644 A | 11/1998 |
| JP | 2001-344602 A | 12/2001 |

(Continued)

OTHER PUBLICATIONS

An Office Action; "Notice of Reasons for Rejection," issued by the Japanese Patent Office on Mar. 24, 2015, which corresponds to Japanese Patent Application No. 2012-027469 and is related to U.S. Appl. No. 13/371,132; with English language concise explanation.

*Primary Examiner* — Lun-Yi Lao
*Assistant Examiner* — Ibrahim Khan
(74) *Attorney, Agent, or Firm* — Studebaker & Brackett PC

(57) ABSTRACT

An object of the present invention is to provide corresponding tactile sensations in accordance with a characteristic of an image displayed. Specifically, an electronic device 10 according to the present invention includes a display unit 102 configured to display an image, a touch sensor 103 configured to detect a touch, a tactile sensation providing unit 104 configured to provide the tactile sensation to a touch face of the touch sensor 103, and a control unit 109 configured to divide the image into a plurality of areas and, when the touch sensor detects the touch to a position corresponding to any of the plurality of areas, to control the tactile sensation providing unit 104 to provide the tactile sensation associated with the area.

11 Claims, 8 Drawing Sheets
(4 of 8 Drawing Sheet(s) Filed in Color)

(56) References Cited

U.S. PATENT DOCUMENTS

| | | | |
|---|---|---|---|
| 2009/0251421 A1 | 10/2009 | Bloebaum | |
| 2010/0045619 A1* | 2/2010 | Birnbaum | G06F 1/1613 |
| | | | 345/173 |
| 2010/0141606 A1* | 6/2010 | Bae | G06F 3/016 |
| | | | 345/174 |
| 2010/0231508 A1* | 9/2010 | Cruz-Hernandez et al. | 345/156 |
| 2011/0131497 A1* | 6/2011 | Goran | G06F 3/0481 |
| | | | 715/723 |

FOREIGN PATENT DOCUMENTS

| | | |
|---|---|---|
| JP | 2006-163579 A | 6/2006 |
| JP | 2006-215776 A | 8/2006 |
| JP | 2007-110638 A | 4/2007 |

* cited by examiner

| FEELING | PATTERN 1 | PATTERN 2 |
|---|---|---|
| BUSHY | xxx | xxx |
| ROUGH FEELING | xxx | xxx |
| HAIRY | xxx | xxx |
| ... | xxx | xxx |
| ... | xxx | xxx |

(b)

| FEELING | PATTERN 1 |
|---|---|
| CUSTOM A | xxx |
| CUSTOM B | xxx |
| ... | xxx |
| ... | xxx |

FIG. 6
(a)
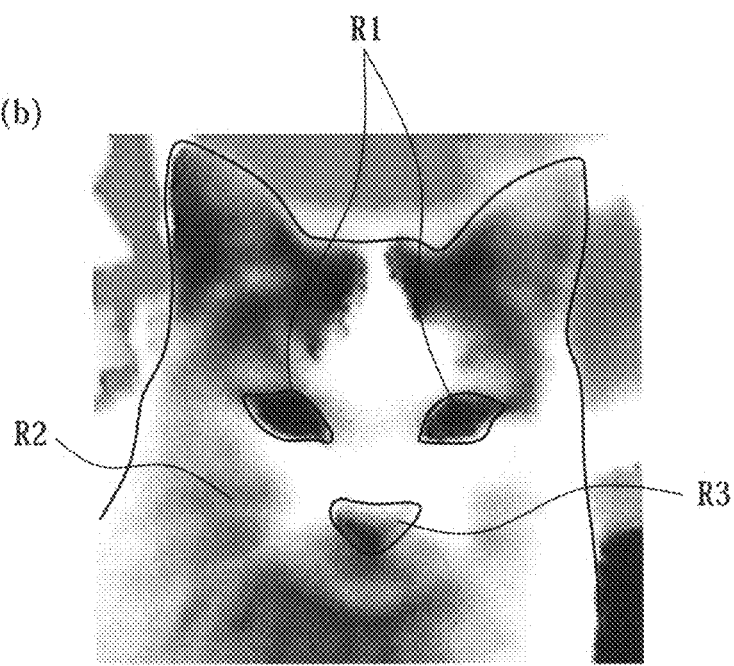
(b)

FIG. 7
(a)
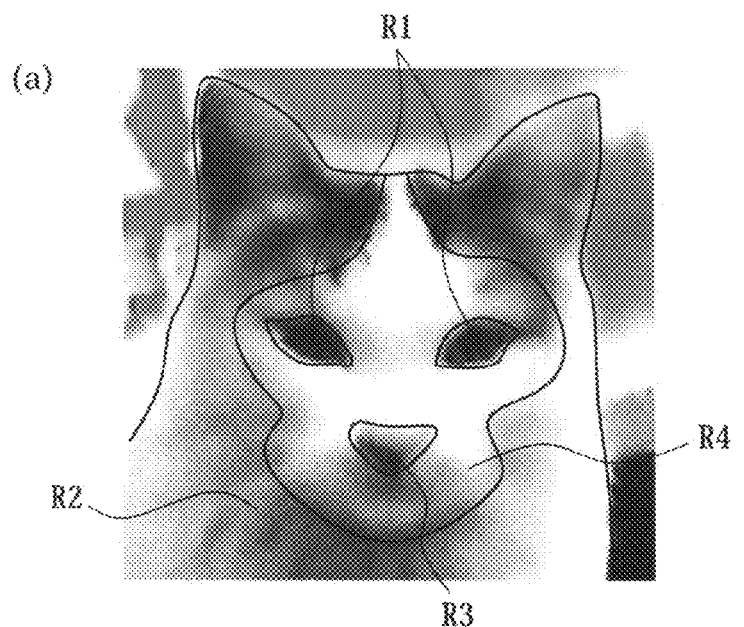
(b)
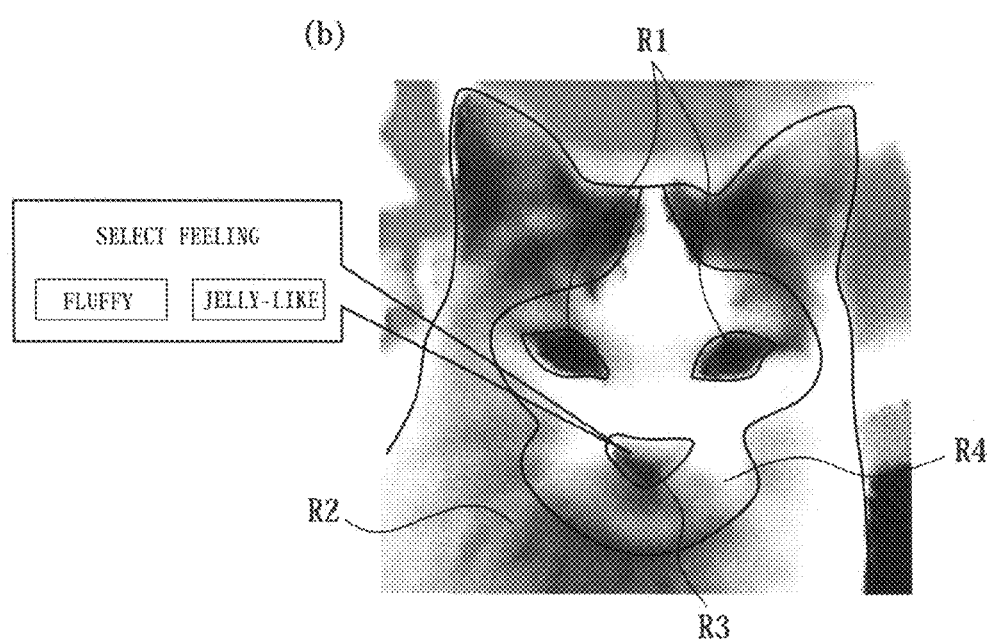

ELECTRONIC DEVICE AND CONTROL METHOD FOR ELECTRONIC DEVICE

TECHNICAL FIELD

The present invention relates to an electronic device and a control method for an electronic device.

BACKGROUND ART

Recently, touch panels and touch pads have been popularly used as input devices of electronic devices. There has been suggested an input device which, when an operator operates the touch panel or the touch pad, provides an operation feeling as feedback to operator's fingertip by vibrating the touch panel or the touch panel in a curving manner (for example, see Patent Document 1).

RELATED ART DOCUMENT

Patent Document

Patent Document 1: Japanese Patent Laid-Open No. 2006-215776

SUMMARY OF THE INVENTION

Problem to be Solved by the Invention

The electronic device described in Patent Document 1, however, provides a uniform tactile sensation on the entire touch panel and thus has a problem that it is not enabled to change the tactile sensation by positions in accordance with, for example, characteristics of an image displayed on the touch panel. In order to express the tactile sensation of the image on the touch panel, accordingly, it has been necessary to add to the image a comment in a text form or a description in a balloon, or together with an arrow. However, since people have different sensations to feelings expressed in letters, it has not been possible for written descriptions to bridge a gap between the sensation intended by a sender and the sensation obtained by a receiver.

Accordingly, it is an object of the present invention, in consideration of such a problem, to provide an electronic device capable of providing tactile sensations in accordance with the characteristics of the image displayed.

Means for Solving the Problems

In order to solve the above problems, an electronic device according to a first embodiment includes:
a display unit configured to display an image;
a touch sensor configured to detect a touch;
a tactile sensation providing unit configured to provide a tactile sensation to a touch face of the touch sensor; and
a control unit configured to divide the image into a plurality of areas and, when the touch sensor detects a touch to a position corresponding to any of the plurality of areas, to control the tactile sensation providing unit to provide the tactile sensation associated with the area.

According to the electronic device of a second embodiment, when the touch sensor detects a touch to a position corresponding to any of the plurality of areas and a data based on a pressing of the touch satisfies a predetermined threshold, the control unit controls the tactile sensation providing unit to provide the tactile sensation associated with the area.

According to the electronic device of a third embodiment, the control unit divides the image into a plurality of areas based on at least one of a spectrum distribution of brightness or color of the image and a frequency spectrum of the image.

According to the electronic device of a fourth embodiment, the control unit sets the tactile sensations associated with the plurality of areas based on at least one of the spectrum distribution of brightness or color of the image and the frequency spectrum of the image.

According to the electronic device of a fifth embodiment, the control unit sets the predetermined threshold based on at least one of the spectrum distribution of brightness or color of the image and the frequency spectrum of the image.

According to the electronic device according to a sixth embodiment, the control unit sets the predetermined threshold for each of the plurality of areas.

The electronic device according to a seventh embodiment includes a storage unit configured to store data of the image in a predetermined image format, wherein
the control unit includes information on the plurality of areas and information on the tactile sensations associated with the plurality of areas in an additive space of the image format in order to store in the storage unit.

The electronic device according to an eighth embodiment includes a communication unit, wherein
the control unit controls the communication unit to transmit, together with the data of the image, the information on the plurality of areas and the information on the tactile sensations associated with the plurality of areas in the image format.

Although a device is used for an explanation of solutions according to the present invention set forth above, it should be understood that the present invention can also be substantialized by a method, a program and a storage medium storing a program, hence these are included within a scope of the present invention.

For example, as a method substantializing the present invention, a control method of an electronic device according to a ninth embodiment including
a display unit configured to display an image,
a touch sensor configured to detect a touch, and
a tactile sensation providing unit configured to provide a tactile sensation to a touch face of the touch sensor, the control method including:
dividing the image into a plurality of areas; and
controlling the tactile sensation providing unit, when a touch to a position corresponding to any of the plurality of areas at the touch sensor is detected, to provide the tactile sensation associated with the area.

Effect of the Invention

According to the electronic device and the control method of an electronic device of the embodiments, it is enabled to provide corresponding tactile sensations in accordance with characteristics of the displayed images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a diagram illustrating examples of tables of tactile sensation patterns.

FIG. 6 illustrates diagrams illustrating examples of divided areas.

FIG. 7 illustrates diagrams illustrating an example of a tactile sensation selection window for a divided area.

DETAILED DESCRIPTION OF PREFERRED EMBODIMENTS

An embodiment of the present invention will be described with reference to the accompanying drawings. In the following embodiment, an electronic device of the present invention is assumed to be, for example, an electronic device having a touch panel, such as a mobile phone and a PDA. However, the electronic device according to the present invention is not limited to these terminals but applicable also to a variety of electronic devices such as, for example, gaming machines, digital cameras, portable audio players, notebook PCs, mini notebook PCs, desktop PCs, digital signage (electronic signboards) and the like.

Figure 1:
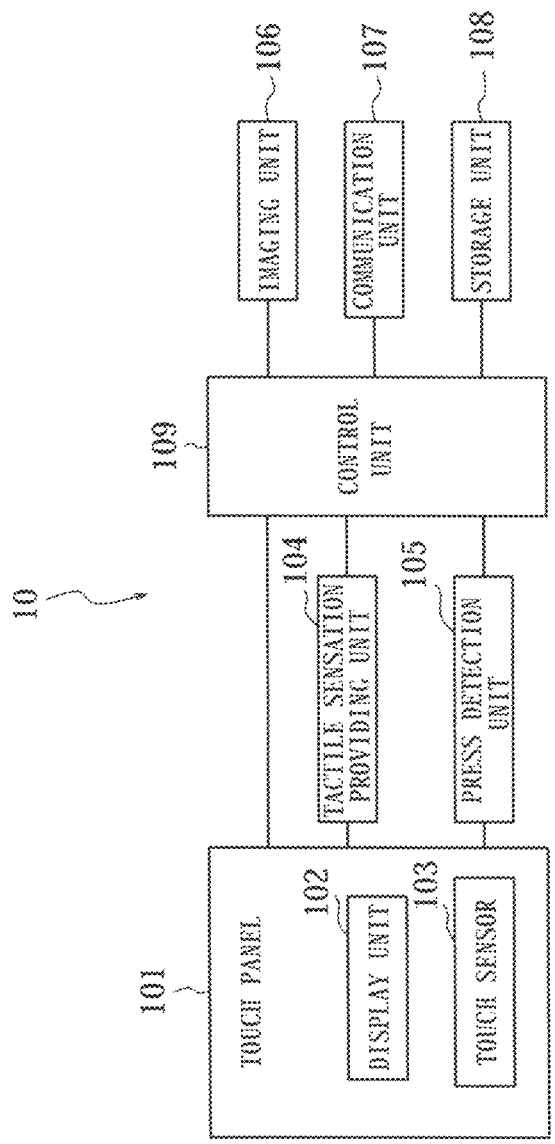
FIG. 1 is a functional block diagram of an electronic device according to one embodiment of the present invention.

FIG. 1 is a functional block diagram schematically illustrating an internal configuration of the electronic device 10 according to one embodiment of the present invention. As illustrated in FIG. 1, the electronic device 10 includes a touch panel 101, a tactile sensation providing unit 104, a press detection unit 105, an imaging unit 106, a communication unit 107, a storage unit 108 and a control unit 109.

Figure 2:
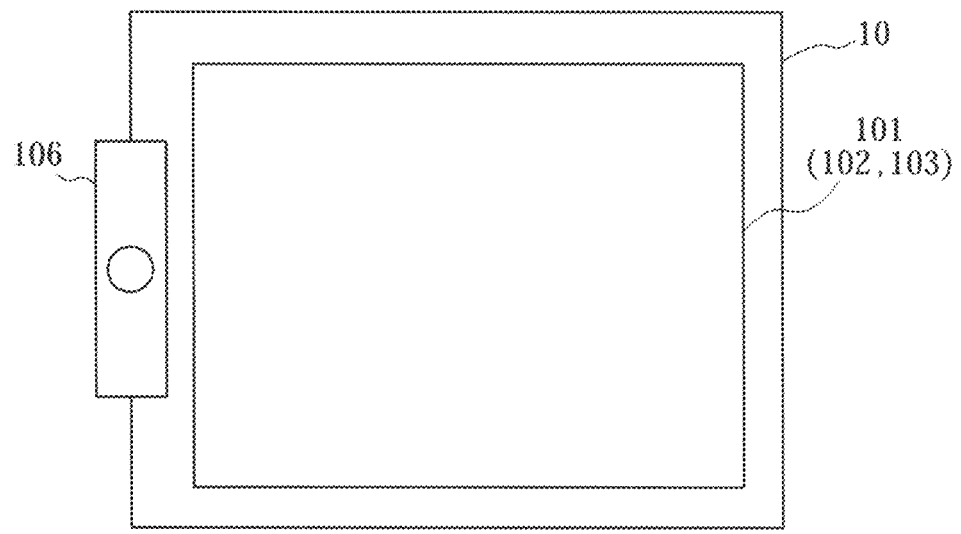
FIG. 2 is a front view of the electronic device illustrated in FIG. 1.

According to the present embodiment, the touch panel 101 includes a display unit 102 and a touch sensor 103. The touch panel 101 may be constituted by the display unit 102 and the touch sensor 103, which is configured to detect a touch by the user, arranged on a front face of the display unit 102 in an overlapping manner. FIG. 2 is a front view of the electronic device 10. The touch panel 101 (the display unit 102 and the touch sensor 103) and the imaging unit 106 are disposed on a front face of the electronic device 10. It is to be noted that the present embodiment also includes a configuration in which the touch sensor 103 is disposed on the front face of the display unit 102 via a supporting member.

The display unit 102 of the touch panel 101 may be constituted by, for example, a liquid crystal display (LCD) or an organic EL display. The display unit 102 displays images obtained by the imaging unit 106, images obtained through the communication unit 107 and images stored in the storage unit 108. It is to be noted that the images includes both still images and video images. The touch sensor 103 is configured to detect a touch to the touch face by a user's finger or the like and disposed on the front face of the display unit 102. The touch sensor 103 may be of a known type such as a resistive film type, a capacitive type and an optical type. When detecting a touch by the user's finger or the like, the touch sensor 103 supplies the control unit 109 with information on a touch position. In detecting a touch, however, it is not necessary for the touch sensor 103 to be physically touched down by the user's finger or the like. When the touch sensor 103 is of the optical type, for example, the touch sensor 103 detects a position where infrared rays are blocked by the finger or the like. Thereby, the touch sensor 103 may detect a touch even when not being physically pressed.

The tactile sensation providing unit 104 conveys vibration to the touch face of the touch sensor 103, and may be configured by using, for example, a piezoelectric element or an ultrasonic transducer. Since the tactile sensation providing unit 104 vibrates, a tactile sensation may be provided to the user's finger or the like touching the touch sensor 103. Also, the tactile sensation providing unit 104 may be constituted by a vibration motor (eccentric motor) and vibrate the electronic device 10 such that the touch face of the touch sensor 103 is indirectly vibrated.

The press detection unit 105 detects a press on the touch face of the touch sensor 103, and is configured by using, for example, a piezoelectric element of a strain gauge sensor and the like. The press detection unit 105 supplies the control unit 109 with a data based on the detected press. A data based on a press is, for example, a pressure load, a voltage, a power and a resistance. For example, when both of the tactile sensation providing unit 104 and the press detection unit 105 are constituted by using the piezoelectric elements, it is possible to integrally configure the tactile sensation providing unit 104 and the press detection unit 105 by a common piezoelectric element. This is because the piezoelectric element has characteristics to generate power when pressure is applied thereon, and deform when power is applied thereto. When the tactile sensation providing unit 104 and the press detection unit 105 are integrally configured by sharing the piezoelectric element as described above, the touch sensor 103 is supported via elastic members formed at four corners of the display unit 102 and the piezoelectric element is attached to a periphery of a bottom face of the touch sensor 103.

The imaging unit 106 takes an image by capturing an actual environment, and may be constituted by, for example, an imaging lens, an imaging element and the like. The image taken by the imaging unit 106 is supplied to the control unit 109. Images taken by the imaging unit 106 in an unconfirmed state (preview state) are also supplied to the control unit 109.

The communication unit 107 communicates with an external device (not illustrated) and is configured by, for example, an interface device corresponding to any radio communication or wired communication and the like. The communication unit 107, for example, transmits and receives image data and emails with the external device.

The storage unit 108 stores the image data in a JPEG format and patterns of the tactile sensations provided by the tactile sensation providing unit 104, as well as functioning as a work memory. Here, the patterns of the tactile sensations are defined by a manner of vibration (a frequency, a phase, a frequency interval, the number of vibrations and the like), an intensity of vibration (amplitude and the like) and the like. FIG. 3 illustrates diagrams of examples of tables of tactile sensation patterns. FIG. 3(a) illustrates a table of patterns of predetermined tactile sensations defining vibration patterns corresponding to feelings such as "Bushy", "Rough Feeling", "Hairy" and the like. FIG. 3(b) illustrates a table of patterns of custom tactile sensations set by the user. The user can set vibration patterns corresponding to feelings "Custom A", "Custom B" and the like.

The control unit 109 controls and manages the electronic device 10 entirely including each function unit thereof and may be constituted by a suitable processor such as a CPU and the like. The control unit 109 preferably divides the image into a plurality of areas and associates the tactile sensation to each of the areas. In addition, the control unit 109, when detecting an input to any of the plurality of areas, controls the tactile sensation providing unit 104 to provide the tactile sensation associated with the area. In providing the tactile sensation upon detection of the touch, it is also possible that the control unit 109 determines that there is a touch to the area when a data based on the press of the touch satisfies a predetermined threshold, and controls the tactile sensation providing unit 104 to provide the tactile sensation associated with the area.

Figure 4:
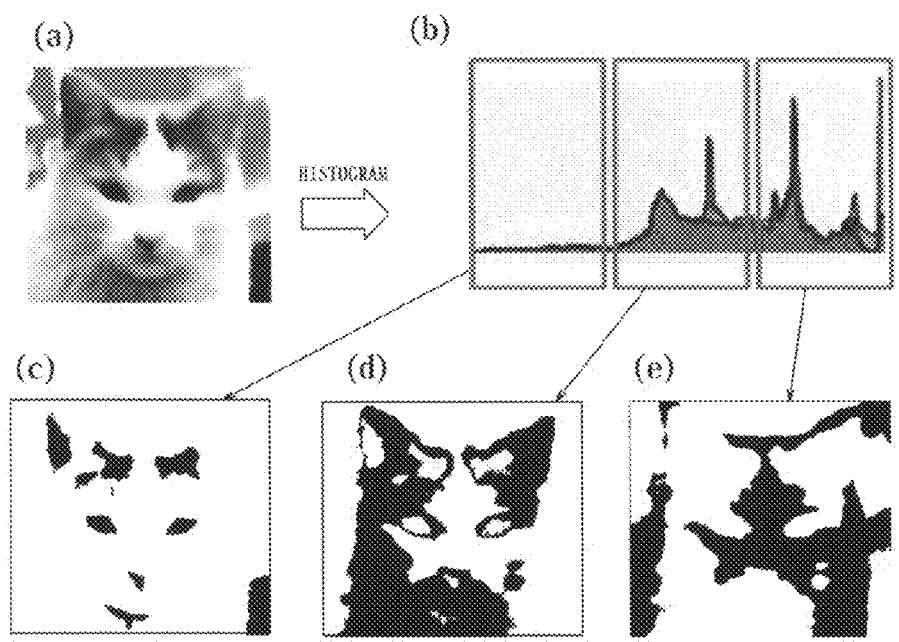
FIG. 4 illustrates an example of image divided into areas by using histogram.

The control unit 109 may divide the image into a plurality of areas based on a spectrum distribution of brightness or color of the image and a frequency spectrum of the image. A histogram of the image illustrates a graph of the spectrum distribution of brightness or color of the image. The histogram of the image includes histograms of every value associated with the image such as a histogram of each of color information (RGB) of the image, a histogram after conversion of the image into a grayscale image and a histogram of brightness. FIG. 4 illustrates an example of the histogram of the color information of an image. FIG. 4(*a*) illustrates the color information of the image and FIG. 4(*b*) illustrates a histogram thereof. The images in FIG. 4(*c*) to (*e*) can be obtained when the image is divided into three areas based on the color information with reference to the peaks of the histogram in FIG. 4(*b*). It is generally known that an RGB value is lower as a black level of an image area is higher and the RGB level is higher as a white level of an image area is higher. Accordingly, an image area in black such as the eyes and the nose of the animal illustrated in FIG. 4(*c*) may be extracted from a low RGB region of the histogram. Or, an image area in white such as the fur of the animal as illustrated in FIG. 4(*d*) and FIG. 4(*e*) may be extracted from a high RGB region of the histogram.

The frequency spectrum of the image represents frequency components of the image and includes every value associated with the image such as a frequency spectrum of the color information (RGB) of the image, a frequency spectrum after conversion of the image into the grayscale image and a frequency spectrum of brightness. The frequency spectrum of the image may be obtained by FFT (Fast Fourier Translation) of the image in a horizontal direction and a vertical direction. For example, here it is assumed to obtain the frequency spectrum of areas of the eyes and the nose of the animal extracted in FIG. 4(*c*). In this case, the areas of the eyes mostly composed of black pixels have high values of a low frequency domain, whereas the area of the nose in varied colors have a value of a high frequency domain higher than that of the eyes. Accordingly, the areas of the eyes and the nose of the animal extracted in FIG. 4(*c*) can be separated on the basis of a difference in the frequency spectrum. Also, it is assumed, for example, to obtain the frequency spectrum of the areas of the fur of the animal extracted in FIG. 4(*d*) and FIG. 4(*e*). In this case, since both of the areas extracted in FIG. 4(*d*) and FIG. 4(*e*) are mostly composed of fine body hair, the frequency spectrums of those areas are highly correlated to each other. Accordingly, the areas of the fur of the animal extracted as a plurality of areas in FIG. 4(*d*) and FIG. 4(*e*) based on the histogram may be combined into one area on the basis of the frequency spectrum.

The control unit 109 may divide the image into a plurality of areas based on a focused level (for example, a blurring level), as well. In addition, the control unit 109 may divide the image into a plurality of areas by image processing such as edge extraction or pattern matching of data of characteristics (a shape, a pattern, color and the like) by the image prestored in the storage unit 108. When the image composes a part of a video image, the control unit 109 may divide the image into a plurality of areas by using a vector obtained based on sequence of images. Or, in case that 3D information on the image is provided when, for example, there are a plurality of imaging units 106, the control unit 109 may divide the image into a plurality of areas based on the 3D information.

In addition, the control unit 109 associates the tactile sensation to each of the areas after dividing the image into the areas. The control unit 109 may set the tactile sensation associated with the area based on the histogram and the frequency spectrum of the image. For example, the control unit 109 may set a feeling "Smooth" for an area in blackish color and the feeling "Bushy" for an area in whitish colon. The control unit 109 may also set a fine tactile sensation for an area with a high frequency and a tactile sensation having a long period for an area with a low frequency. On when the storage unit 108 stores a correspondence table in which color information, frequency information and materials of objects (a metal, elastic body and the like) are associated with one another, the control unit 109 may set the tactile sensation by using the correspondence table. When the storage unit 108 stores conceptual information of objects (such as "Tofu is soft") specified by the color information and the frequency information, the control unit 109 may set the tactile sensation by using the conceptual information.

When the threshold of a data based on the press is used for determination of the touch, the control unit 109 may set the threshold based on the histogram and the frequency spectrum of the image. For example, the control unit 109 may set the threshold of a data based on the press to be high for an area with a low frequency due to rough focus and set the threshold to be low for an area with a high frequency area due to intense focus. When the storage unit 108 stores the correspondence table in which the color information, the frequency information, and materials of objects are associated with one another, the control unit 109 may set the threshold of a data based on the press by using the correspondence table. When the storage unit 108 stores the conceptual information of objects specified by the color information and the frequency information, the control unit 109 may set the threshold of a data based on the press by using the conceptual information.

The control unit 109 may include information on the areas dividing the image and information on the tactile sensations associated with the areas in an additive space of the image format of the image data and store them in the storage unit 108. Or, the control unit 109 may include the thresholds of a data based on the press set for the areas in, the additive space of the image format and store them in the storage unit 108. For example, the JPEG format may be used for storing, together with the image data, the information on the divided areas, the information on the tactile sensations and the information on the thresholds. The JPEG format includes the image data and an Exif area serving as the additive space allowing adding a date, a condition and a location of an image thereto. Therefore, the Exif area enables to embed the information on the divided areas, the information on the tactile sensations and the information on the thresholds in the image data. It is also possible to use any image format having an additive space other than the JPEG format.

Moreover, the control unit may transmit, together with the image data, the information on the divided areas and the information on the tactile sensation associated with each of the areas by the communication unit 107 by using a predetermined image format. Further, the control unit 109 may transmit, together with the image data, the thresholds of the press set for the areas by the communication unit 107 by using the predetermined image format. For example, when the image data themselves, the information on the divided areas, the information on the tactile sensations and the information on the thresholds are combined into one image file (hereinafter, referred to as an "image file with the tactile sensation") by using the JPEG format, the control unit 109 may transmit the image file with the tactile sensation from the communication unit 107 in the same manner as usual image files. When the external device (not illustrated) receives the image file with the tactile sensation and is capable of reproducing the information on the divided areas, the information on the tactile sensations and the information on the thresholds on its own, the external device may set the areas on the image according to the information on the image file and, when detecting a touch, provide the tactile sensation associated with the area. Even if the external device is not capable of reproducing the image file with the tactile sensation, the external device may reproduce the image data themselves in the JPEG format. Therefore, the image file with the tactile sensation in the JPEG format does not adversely affect a non-compliant device.

Figure 5:
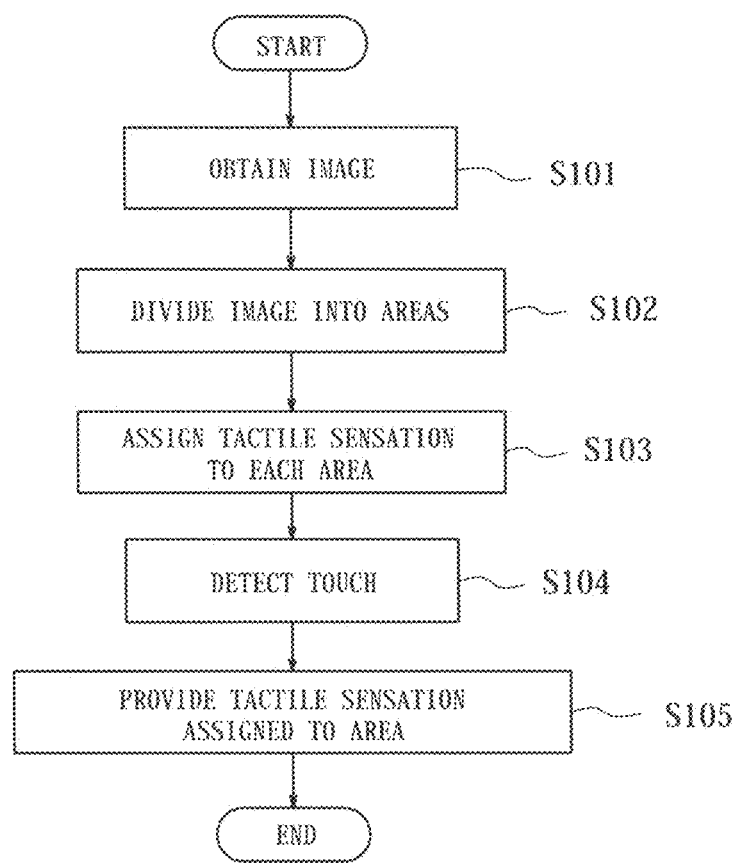
FIG. 5 is a flowchart of operations of the electronic device illustrated in FIG. 1.

FIG. 5 is a flowchart of operations of the electronic device 10. First, the control unit 109 obtains an image through, for example, the imaging unit 106 (step S101). The control unit 109 may obtain an image obtained through the communication unit 107 or an image stored in the storage unit 108. Next, the control unit 109 divides the image into a plurality of areas (step S102). The control unit 109 may divide the image into a plurality of areas based on the histogram and the frequency spectrum of the image. After dividing the image into the areas, the control unit 109 assigns the tactile sensation to each of the areas (step S103). The control unit 109 may assign the tactile sensations to the areas based on the histogram and the frequency spectrum of the image. Then, when detecting a touch to the area (step S104), the control unit 109 controls the tactile sensation providing unit 104 to provide the tactile sensation assigned to the area (step S105). It is also possible that, when a data based on the press of the touch satisfies the predetermined threshold, the control unit 109 controls the tactile sensation providing unit 104 to provide the tactile sensation associated with the area. The control unit 109 may divide the image into the areas, assign the tactile sensations and set the predetermined thresholds based on an image contrast in place of the histogram of the image.

FIG. 6 illustrates diagrams illustrating an example of divided areas. The control unit 109 may divide the image illustrated in FIG. 6(a) into the areas as illustrated in FIG. 6(b). For example, the control unit 109 may divide the image into areas R1 corresponding to the eyes, an area R2 corresponding to the body hair, and an area R3 corresponding to the nose, based on the histogram and the frequency spectrum of the image. Next, the control unit 109 assigns feeling "Slick" to the areas R1 corresponding to the eyes, feeling "Bushy" to the area R2 corresponding to the body hair, and feeling "Jelly-like" to the area R3 corresponding to the nose, respectively. Accordingly, when the user inputs to the area R1 corresponding to the eyes, for example, the electronic device 10 provides the tactile sensation "Slick" to the user. It is to be noted that lines defining each of the areas in FIG. 6(b) may be not displayed to the user.

FIG. 7 illustrates diagrams depicting an example displaying a tactile sensation selection window for overlapping areas. As illustrated in FIG. 7(a), the control unit 109 divides the image into the areas R1 corresponding to the eyes, the area R2 corresponding to the body hair, the area R3 corresponding to the nose and an area R4 corresponding to a center of the face, based on the histogram and the frequency spectrum of the image. Here, since the area R3 corresponding to the nose and the area R4 corresponding to the center of the face are set overlapping with each other, the control unit 109 displays the tactile sensation selection window as illustrated in FIG. 7(b) so that the user manually selects the tactile sensation. When there are overlapping areas, it is also possible that the control unit 109 provides a synthesized tactile sensation composed of the tactile sensations assigned to those overlapping areas or provides the tactile sensations alternately at predetermined intervals. If the control unit 109 determines that the tactile sensations of the overlapped areas interfere with each other and thus the synthesized tactile sensation does not provide a significant tactile sensation, the control unit 109 may display the tactile sensation selection window.

According to the present embodiment, as stated above, the control unit 109 divides the image into a plurality of areas and, when the touch sensor 103 detects a touch to a position corresponding to any of the plurality of areas, controls the tactile sensation providing unit 104 to provide the tactile sensation associated with the area. It is thus enabled to provide the tactile sensation in accordance with the characteristics of the image displayed. That is, it is possible to present an intended tactile sensation in association with the image without adding a text description to the image.

According to the present embodiment, when the touch sensor 103 detects a touch to a position corresponding to any of the plurality of areas and a data based on the press of the touch satisfies the predetermined threshold, the control unit 109 may control the tactile sensation providing unit 104 to provide the tactile sensation associated with the area. Thereby, it is possible to provide the tactile sensation only when there is a certain touch by the user, which prevents an erroneous operation in response to an unintentional touch such as when the user touches the touch panel by mistake.

According to the present embodiment, the control unit 109 may divide the image into a plurality of areas based on at least one of the spectrum distribution of brightness or color of the image and the frequency spectrum of the image. Thereby, it is enabled to divide the image into areas based on the characteristics of the image.

According to the present embodiment, the control unit 109 may associate the tactile sensations with a plurality of areas based on at least one of the spectrum distribution of brightness or color of the image and the frequency spectrum of the image. Thereby, it is enabled to set the tactile sensations corresponding to the characteristics of the image, such as a hard area and a soft area, for each of the areas.

According to the present embodiment, the control unit 109 may set the predetermined threshold of a data based on the press of the touch based on at least one of the spectrum distribution of brightness or color of the image and the frequency spectrum of the image. Thereby, it is enabled to set the threshold to each of the areas in accordance with the characteristics of the image such as an easy tactile sensation providing area and a hard tactile sensation providing area.

According to the present embodiment, the control unit 109 sets the predetermined threshold of the press of the touch for each of a plurality of areas. Thereby, it is enabled to set the threshold for each of the areas such as the easy input area and the hard input area.

According to the present embodiment, the control unit 109 may include information on a plurality of areas and information on the tactile sensations associated with the plurality of areas in the additive space of the image format and store them in the storage unit 108. Thereby, it is enabled to combine the information on the plurality of areas and the information on the tactile sensations associated with the plurality of areas with the image data into one file. Also, the user is enabled to reproduce by appropriately retrieving data of the tactile sensation previously set from the storage unit 108.

According to the present embodiment, the control unit 109 may transmit, together with the image data, the information on a plurality of areas and the information on the tactile sensations associated with the plurality of areas by the communication unit by using the predetermined image format. Accordingly, it is enabled to transmit the image file with the tactile sensation to another user. For example, it enables to share a sender's feeling between a sender and a receiver in a variety of situations such as, for example, when the sender has taken an image of his/her baby and wishes to convey a soft feeling of the baby's cheek to the receiver, and when the sender has taken a picture of his/her pet and wishes to convey a bushy feeling of its hair. Further, it is also enabled, for example, to upload the image file with the tactile sensation to a server to be displayed on a webpage. In this case, when the user viewing the webpage on the terminal having the touch panel touches the image file with the tactile sensation, the user is provided with the tactile sensation associated with a touch area. Such a scheme may make, for example, distributed news more vivid. Moreover, more detailed information in a webpage for introduction of products, reviews and the like may be provided. Further, better descriptions to SNS (Social Networking Service) and blogs may be provided. Recently, in addition, electronic signboards have been widely placed at train stations and the like. Accordingly, it may be possible to substantialize advertisements that attract more attention by distributing the image file with the tactile sensation to the electronic signboards.

Although the present invention is described based on figures and the embodiment, it is to be understood that those who are skilled in the art may easily vary or alter in a multiple manner based on disclosure of the present invention. Accordingly, such variation and modification are included in a scope of the present invention. For example, a function included in each unit, each means or each step may be rearranged avoiding a logical inconsistency, such that a plurality of means or steps are combined or divided.

Figure 8:
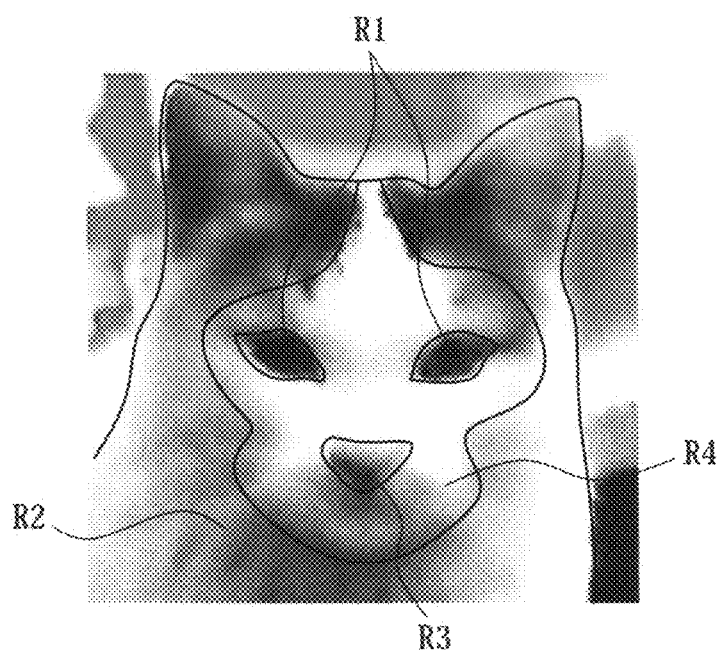
FIG. 8 is a diagram illustrating an example of a tactile sensation setting panel for divided areas.

According to the electronic device of the present invention, for example, it may be possible that the electronic device automatically divides the image into areas and enables the user to manually set the tactile sensation to each of the areas. FIG. 8 is a diagram illustrating an example of a tactile sensation setting panel for manual setting. The user may set a desired tactile sensation to a desired area. In this case, when the user inputs to setting keys such as "Fluffy" and "Rough Feeling", the electronic device 10 may provide the tactile sensations corresponding to the setting keys to the user. Thereby, the user is enabled to assign the tactile sensation to each of the areas by actually confirming the tactile sensations such as "Fluffy" and "Rough Feeling".

The display unit and the touch sensor in the embodiment set forth above may be constituted by an integrated device, such as a common substrate having functions of them and the like. Such an integrated device having both functions of the display unit and the touch sensor may have a configuration in which, for example, a plurality of photoelectric conversion elements such as photodiodes are orderly mixed in a group of pixel electrodes arranged in a matrix pattern in the liquid crystal panel. This integrated device may display an imagine in a structure of the liquid crystal panel and also detect a contact position by nearby photoelectric conversion elements that receive backlight of the liquid crystal display reflected by a tip of a pen in contact with a desired position on the face of the panel.

According to the embodiment set forth above, the control unit controls the tactile sensation providing unit to provide the tactile sensation associated with the touch area when a data based on the press of the touch detected by the press detection unit satisfies the predetermined threshold. In this case, "when a data based on the press detected by the press detection unit satisfies the predetermined standard" may include "when the press detected by the press detection unit reaches the predetermined value", "when a data based on the press detected by the press detection unit exceeds the predetermined value", or "when the predetermined value is detected by the press detection unit".

In the description set forth above, technical ideas represented by expressions such as, for example, "equal to or higher than" the predetermined value and "equal to or lower than" the predetermined value are not necessarily in strict senses but may either include or exclude the predetermined value in accordance with specifications of mobile terminals. For example, the expression "equal to or higher than" the predetermined value may include not only when an increasing value teaches the predetermined value but also when the increasing value exceeds the predetermined value. Similarly, the expression "equal to or lower than" the predetermined value may include not only when an decreasing value reaches the predetermined value but also when the decreasing value falls under the predetermined value, that is, when the reducing value becomes below the predetermined value.

EXPLANATION OF REFERENCE NUMERALS

10 Electronic device
101 Touch panel
102 Display unit
103 Touch sensor
104 Tactile sensation providing unit
105 Press detection unit
106 Imaging unit
107 Communication unit
108 Storage unit
109 Control unit

What is claimed is:

1. An electronic device comprising:
a display unit configured to display an image;
a touch sensor configured to detect a touch;
a tactile sensation providing unit configured to provide a tactile sensation to a touch face of the touch sensor; and
a control unit configured to divide the image into a plurality of areas, set tactile sensations each associated with the areas, wherein each tactile sensation is associated with a predetermined threshold based on a frequency spectrum of the image of each portion of an area such that the predetermined threshold of one area differing from the predetermined threshold of an another area,
differentiation of the predetermined threshold of the one area as compared with the predetermined threshold of the another area is done by at least one of a manner of vibration and an intensity of vibration, and,
when the touch sensor detects a touch to a position corresponding to any of the plurality of areas, to control the tactile sensation providing unit to provide the tactile sensation associated with the area and when the touch sensor detects a touch to a position corresponding to any of the plurality of areas and a data based on a pressing of the touch satisfies a predetermined threshold associated to each area, the control unit starts to control the tactile sensation providing unit to provide the tactile sensation associated with the area.

2. The electronic device according to claim 1, wherein the control unit divides the image into a plurality of areas based on at least one of a spectrum distribution of brightness or color of the image and a frequency spectrum of the image.

3. The electronic device according to claim 1, wherein the control unit sets the tactile sensations associated with the plurality of areas based on at least one of the spectrum distribution of brightness or color of the image and frequency spectrum of the image.

4. The electronic device according to claim 1, wherein the control unit sets the predetermined threshold for each of the plurality of areas.

5. The electronic device according to claim 1, comprising a storage unit configured to store data of the image in a predetermined image format, wherein
the control unit includes information on the plurality of areas and information on the tactile sensations associated with the plurality of areas in an additive space of the image format in order to store in the storage unit.

6. The electronic device according to claim 5, comprising a communication unit, wherein
the control unit controls the communication unit to transmit, together with the data of the image, the information on the plurality of areas and the information on the tactile sensations associated with the plurality of areas in the image format.

7. The electronic device according to claim 1, wherein the control unit is manually controlled to set differing vibrational tactile sensations to the plurality of areas.

8. A control method of an electronic device having
a display unit configured to display an image
a touch sensor configured to detect a touch, and
a tactile sensation providing unit configured to provide a tactile sensation to a touch face of the touch sensor, the control method comprising:
dividing the image into a plurality of areas;
controlling the tactile sensation providing unit, when a touch to a position corresponding to any of the plurality of areas at the touch sensor is detected, to provide the tactile sensation associated with the area and when the touch sensor detects a touch to a position corresponding to any of the plurality of areas and a data based on a pressing of the touch satisfies a predetermined threshold associated to each area, starts to control the tactile sensation providing unit to provide the tactile sensation associated with the area;
dynamically setting the predetermined threshold based on a frequency spectrum of the image of each portion of an area, wherein the predetermined threshold of one area differs from the predetermined threshold of another area; and
differentiating the predetermined threshold of the one area as compared with the redetermined threshold of the another area by at least one of a manner of vibration and an intensity of vibration.

9. An electronic device comprising:
a display unit configured to display an image;
a touch sensor configured to detect a touch;
a tactile sensation providing unit configured to provide a tactile sensation to a touch face of the touch sensor; and
a control unit configured to divide the image into a plurality of areas and, when the touch sensor detects a touch to a position corresponding to any of the plurality of areas and a data based on a pressing of the touch satisfies a predetermined threshold associated to each area, to start to control the tactile sensation providing unit to provide the tactile sensation associated with the area,
the control unit dividing the image into a plurality of areas based on a frequency spectrum of the image,
the control unit dynamically setting the tactile sensations associated with the plurality of areas based on the frequency spectrum of the image of each portion of an area, wherein the predetermined threshold of one area differs from the predetermined threshold of another area,
differentiation of the predetermined threshold of the one area as compared with the predetermined threshold of the another area is done by at least one of a manner of vibration and an intensity of vibration.

10. The electronic device according to claim 9, further comprising a communication unit, wherein the control unit divides the image based on a focused level into the plurality of areas.

11. The electronic device according to claim 9, further comprising a communication unit, wherein the control unit sets the tactile sensation with the plurality of areas based on at least a quality of material of the plurality of areas.

* * * * *